(12) United States Patent
Cadambi et al.

(10) Patent No.: US 7,398,278 B2
(45) Date of Patent: Jul. 8, 2008

(54) PREFIX PROCESSING TECHNIQUE FOR FASTER IP ROUTING

(75) Inventors: Srihari Cadambi, Cherry Hill, NJ (US); Srimat Chakradhar, Manalapan, NJ (US); Hirohiko Shibata, Kanagawa (JP)

(73) Assignees: NEC Electronics Corporation, Kanagawa (JP); NEC Laboratories America, Inc., Princeton, NJ (US)

( * ) Notice: Subject to any disclaimer, the term of this patent is extended or adjusted under 35 U.S.C. 154(b) by 139 days.

(21) Appl. No.: 11/133,226

(22) Filed: May 20, 2005

(65) Prior Publication Data

US 2006/0200581 A1   Sep. 7, 2006

Related U.S. Application Data

(60) Provisional application No. 60/658,167, filed on Mar. 4, 2005.

(51) Int. Cl.
  *G06F 7/00*  (2006.01)
  *G06F 17/30*  (2006.01)

(52) U.S. Cl. .................................. 707/101; 707/6
(58) Field of Classification Search .............. 707/6, 707/101

See application file for complete search history.

(56) References Cited

OTHER PUBLICATIONS

Yu et al., "Forwarding Engine for Fast Routing Lookups and Updates", 1999 IEEE, Global Telecommunications Conference-Globecom'99.*

* cited by examiner

*Primary Examiner*—Hosain Alam
*Assistant Examiner*—Van H Ngo
(74) *Attorney, Agent, or Firm*—Sughrue Mion, PLLC

(57) ABSTRACT

A method of storing addresses in a database comprising generating original prefixes representing the addresses to be stored in the database. The prefix lengths are determined dynamically. Reduced prefixes are generated by collapsing or expanding the original prefixes such that a number of reduced prefixes is less than a number of original prefixes. The reduced prefixes are stored in the database.

6 Claims, 6 Drawing Sheets

| NAME | PREFIX | FORWARDING INFO |
|---|---|---|
| P0 | 0* | A |
| P1 | 1* | B |
| P2 | 10* | C |
| P3 | 100* | C |
| P4 | 1000* | D |
| P5 | 11100* | E |

FIG. 1

PREFIX PROCESSING TECHNIQUE FOR FASTER IP ROUTING

I.A. RELATED APPLICATIONS

This Application claims priority from now abandoned U.S. Provisional Application Ser. No. 60/658,167, with inventors Srihari Cadambi, Srimat Chakradhar, Hirohiko Shibata, filed Mar. 4, 2005, which is incorporated in its entirety by reference.

I.B. FIELD

This disclosure teaches pre-processing techniques to reduce the number of prefix lengths in IP routing and other networking databases.

I.C. BACKGROUND

1. References

The following papers provide useful background information, for which they are incorporated herein by reference in their entirety, and are selectively referred to in the remainder of this disclosure by their accompanying reference codes in square brackets (i.e., [3] for the paper by Srinivasan.

1. Technologies, S., SiberCAM Ultra-18M SCT1842. 2002.
2. N. McKeown and P. Gupta, Algorithms for Packet Classification. IEEE Network, 2001. 15(2): p. 24-32.
3. V. Srinivasan, G. Varghese, S. Suri, M. Waldvogel, Fast and scalable layer four switching. ACM SIGCOMM Computer Communication Review, Proceedings of the ACM SIGCOMM '98 conference on Applications, technologies, architectures, and protocols for computer communication, 1998. 28(4).
4. S. Cadambi, S. Chakradhar, N2SE: The NEC Network Search Engine. 2004.
5. S Cadambi, J. Kilian, P Ashar, H Shibata, BCAM: A High-Performance, Low-Power Network Router Using Bloomier Filters. 2004, NEC Laboratories America, Inc.
6. S. Cadambi, J. Kilian, P. Ashar, Inexpensive and Fast Content Addressable Memory. 2004, NEC Laboratories America, Inc.
7. S. Dharmapurikar, K. Prabhakar, D. Taylor,. Longest prefix matching using bloom filters in Proceedings of the 2003 conference on Applications, technologies, architectures, and protocols for computer communications. August 2003.
8. B. Chazelle, J. Kilian, R. Rubinfeld and A. Tal, The Bloomier Filter: An Efficient Data Structure for Static Support Lookup Tables. Proceedings, Symposium on Discrete Algorithms (SODA), 2004.
9. V. Srinivasan, G. Varghese, Fast Address Lookups Using Controlled Prefix Expansion. ACM Transactions on Computer Systems (TOCS), 1999. 17(1): p. 1-40.
10. V. Srinivasan, G. Varghese, Method and Apparatus for Fast Hierarchical Address Lookup using Controlled Expansion of Prefixes. 2000, Washington University, St Louis: USA.

2. Introduction

An increased use of applications with high bandwidth requirements, such as video conferencing and real-time movies, has resulted in a steep growth in internet traffic as well as an increase in the number of hosts. In order to provide acceptable performance, communication links are being upgraded to support higher data rates. However, higher link speeds translate to better end-to-end performance only if network routers, which filter and route Internet Protocol (IP) packets, are commensurately faster. A significant bottleneck in a network router is the IP address lookup, which is the process of forwarding a packet to its destination. This is commonly known as IP forwarding. Other important tasks performed by network routers such as packet classification are also made faster if this basic lookup process is accelerated.

Given a set of prefixes, the lookup problem consists of finding the longest prefix that matches an incoming header. A prefix corresponds to an internet address, or its initial portion. This problem is referred to as Longest Prefix Matching, or LPM. Three major categories of hardware solutions for LPM are content-addressable memories (CAMs), tree-based algorithmic solutions and hash-based solutions.

The disclosed teachings are aimed at prefix pre-processing techniques that will benefit tree-based and hash-based solutions.

3. Background Information on Prefix Processing

A prefix of length L is a regular expression whose L most significant bits are valid, while all other bits are considered as "don't-cares". This description is restricted to regular expressions that are integers (for instance, an internet address). The number of valid bits in a prefix is referred to as the prefix length.

a) Longest Prefix Matching

A prefix refers to an IP address or its initial portion. For instance, "100.10" is a prefix of "100.10.1.2". A prefix database contains forwarding information for "100.10". However, it may contain more refined forwarding information for the larger prefix "100.10.1.2". Therefore, an incoming IP address must be compared with all prefixes, and the forwarding information corresponding to the longest matching prefix must be discovered.

For instance, consider a router which forwards ".com" packets to port A. If the router is located such that the domain "nec.com" is more easily accessible via port B, it should route "nec.com" packets to port B. Therefore, incoming packets with "nec.com" as their destination address will be forwarded to B, while all other ".com" packets to port A.

A simple prefix table is shown in FIG. 1. The prefix table of FIG. 1 is used as a running example throughout this document.

Popular implementations of LPM include Ternary CAMs (TCAMs) [1], tree-based solutions and hash-based solutions. The prefix processing techniques disclosed in this disclosure benefits the latter two approaches, both of which are briefly introduced below.

b) Tree-based Solutions

The basic tree data structure for the prefix table in FIG. 1 is shown in FIG. 2. A tree is constructed from the given prefixes. At each node of the tree corresponding to level L, the L'th bit of the incoming header is examined, and action is taken depending on whether the bit is 1 or 0. For instance, at the root, the first bit of the header is examined. If this bit is 0, the header matches prefix P0 and no other prefix. If this bit is 1, then further checks are necessary to correctly determine the longest matching prefix. This requires traversal of the tree.

Hence, the latency of discovering the longest prefix match depends on the depth of the tree.

Several improvements have been proposed for the tree-based algorithm [2, 3]. A common enhancement is to avoid the bit-by-bit comparison, and "jump" to the next prefix length by comparing several bits at each node of the tree. Such a technique is greatly benefited by a reduction in the number of prefix lengths.

c) Hash-based Solutions

Hash-based approaches construct a hash table for each distinct prefix length. FIG. 3 shows the hash-based approach for the example prefix table. The hash table for each prefix length is optimized to provide very fast queries. All hash tables are accessed in parallel (in a hardware implementation). A priority encoder at the output of the hash tables selects the longest matching prefix.

Several improvements to the hash-based approach exist ([4-8]). These references use sophisticated techniques to improve the performance of hash tables which otherwise have a poor worst-case search latency. However, the basic architectural template remains the same.

d) Related Art: Controlled Prefix Expansion

Varghese, et al ([9, 10]) proposed a prefix expansion technique where the given prefixes are expanded into prefixes belonging to a pre-selected set of prefix lengths.

II. SUMMARY

To overcome the disadvantages discussed above, the disclosed teachings provide a method of storing addresses in a database comprising generating original prefixes representing the addresses to be stored in the database. The prefix lengths are determined dynamically. Reduced prefixes are generated by collapsing or expanding the original prefixes such that a number of reduced prefixes is less than a number of original prefixes. The reduced prefixes are stored in the database.

Another aspect of the disclosed teachings is a computer program product including computer-readable media that includes instructions to enable a computer to perform the disclosed techniques.

III. BRIEF DESCRIPTION OF THE DRAWINGS

The above objectives and advantages of the disclosed teachings will become more apparent by describing in detail preferred embodiments thereof with reference to the attached drawings in which:

FIG. 1 shows a simple prefix table.

IV. DETAILED DESCRIPTION

IV.A. Synopsis

In the disclosed techniques, the given prefixes are not expanded into a pre-determined set of prefix lengths. On the other hand, the prefix lengths are determined dynamically using the disclosed prefix processing algorithm. Sometimes prefixes are collapsed into shorter prefix lengths. The best prefix lengths are determined based on an objective function, which minimizes the number of prefix lengths.

IV.B. An Objective

Given a prefix set SP and an integer C, expand or collapse the prefixes in SP to a new set SP' such that the number of prefix lengths in SP' is minimized and the number of prefixes in each prefix length is less than C.

IV.C. Exemplary Embodiment

The exemplary embodiment discussed herein uses a greedy algorithm as outlined below. It produces good solutions in practice. Each prefix length that are collapsed or expanded prefixes into is considered a bin with a given capacity. A bin could be a memory.

The exemplary embodiment has two parts. The first is prefix collapsing, and the second is prefix expansion.

Figure 2:
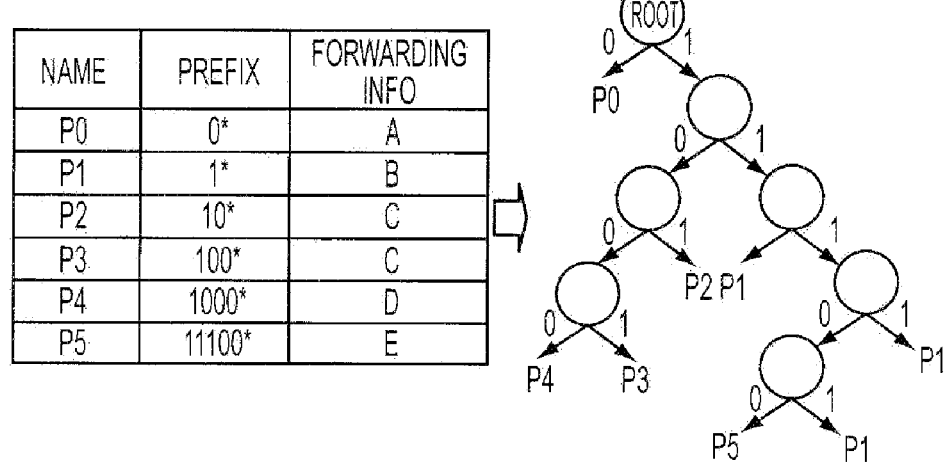
FIG. 2 shows a basic tree-based solution for FIG. 1.
Figure 3:
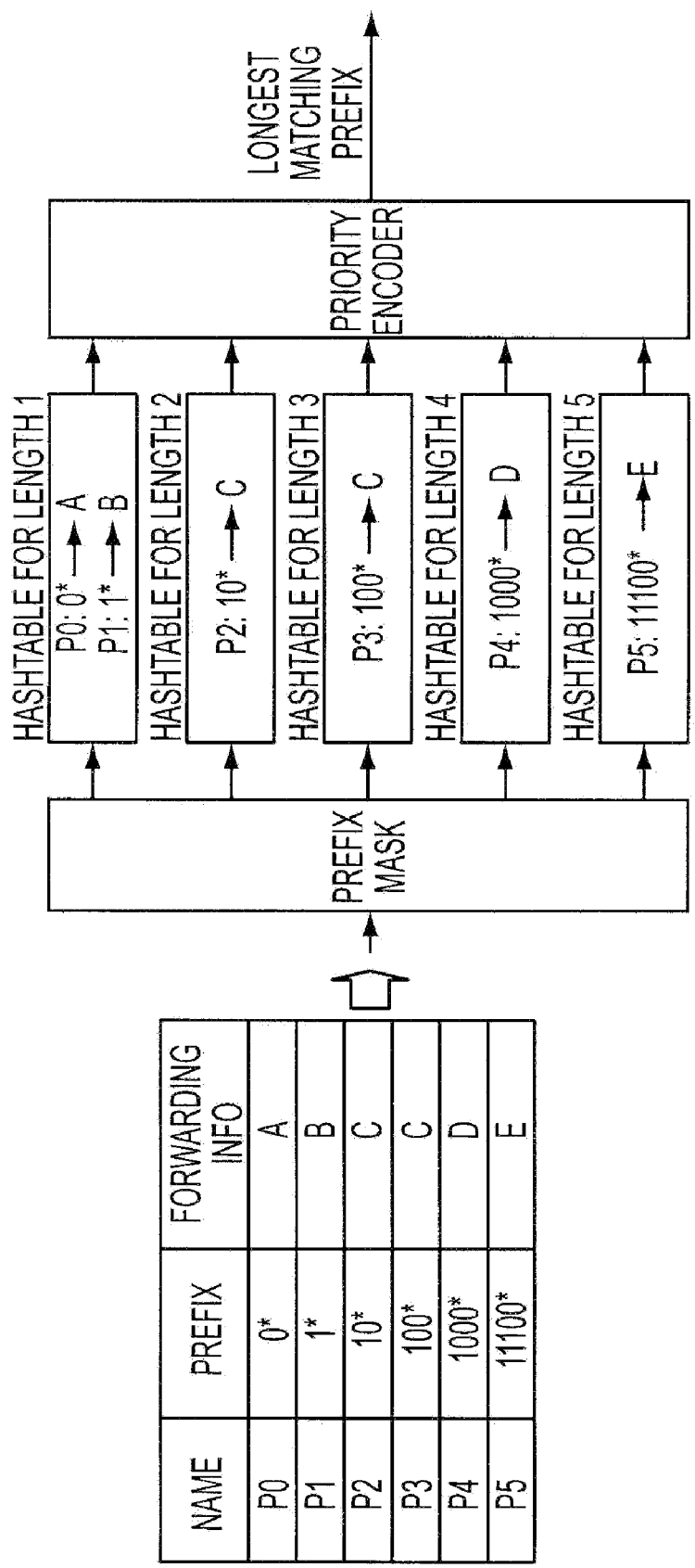
FIG. 3 shows a basic hash-based solution for FIG. 1.
Figure 4:
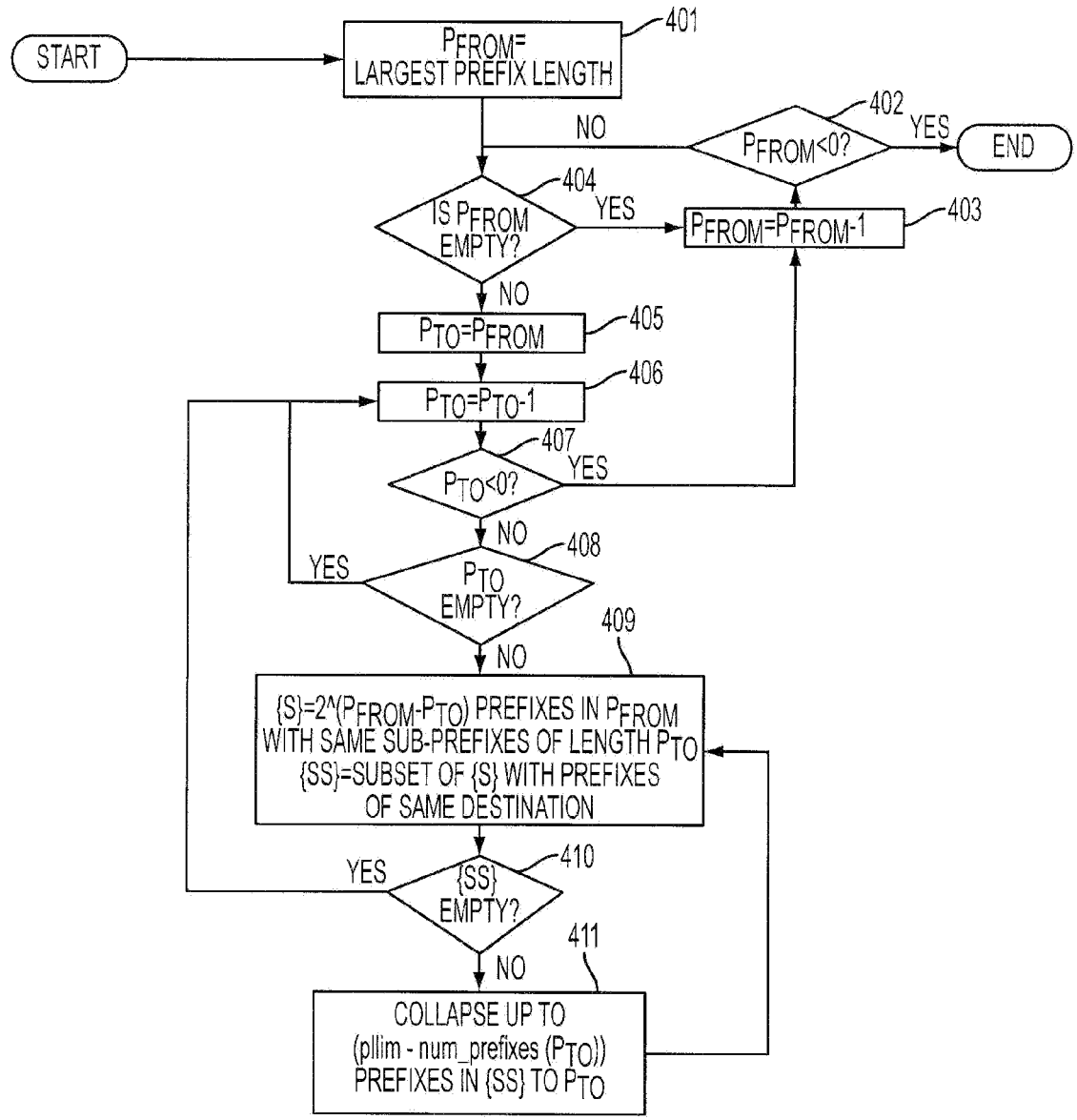
FIG. 4 shows an exemplary implementation of the disclosed prefix collapsing technique.

Prefix collapsing proceeds as follows (FIG. 4). The largest prefix length (denoted $P_{from}$ in Box 401 in FIG. 4) is considered first. If this prefix length is empty (i.e., has no prefixes), $P_{from}$ is decreased until the first populated prefix length if found (Boxes 402-404 in FIG. 4). This is the "source" prefix length from which prefixes will be collapsed. Next, a "destination" prefix length $P_{to}$ is found into which the collapsed prefixes from $P_{from}$ will be inserted. Boxes 405-408 in FIG. 4 depicts this. In essence, $P_{to}$ is the largest populated prefix length smaller than $P_{from}$. Then, a "complete set" S of $2^{Pfrom-Pto}$ prefixes that have a common sub-prefix of length $P_{to}$ is extracted (Box 409, FIG. 4). For example 0000→A, 0001*→A, 0010*→A, 0011→B comprise a complete set of 4 prefixes of length 4 with a common sub-prefix "00". From S, the largest subset of prefixes that have the same destination is extracted (set SS in Box 409 of FIG. 4). This subset of prefixes is collapsed into a single prefix of length $P_{to}$. Note that this is possible provided the following two conditions are satisfied, which is ensured by the algorithm in the flowchart of FIG. 4: (i) prefixes of length $P_{to}$ exist (i.e., a new prefix length should not be created) and (ii) the common sub-prefix does not already exist in the set of prefixes of length $P_{to}$ (the "Collapse" routine in Box 411 ensures this). In the above example consisting of 0000*→A, 0001*→A, 0010*→A, 0011*→B, three out of four prefixes have the same destination A. Therefore, the three prefixes can be collapsed into a single prefix 00*->A of prefix length 2, while the fourth prefix 0011*->B is retained in prefix length 4. Such a transformation still provides correct longest prefix match operation.

Prefix expansion proceeds as outlined in the following steps:

All prefixes from the largest prefix length L1 are allocated to as many bins as required. If $n_{L1}$ bins are needed, $n_{L1-1}$ bins will be full, while one bin may be partially filled after this expansion.

If a partially filled bin exists, as many prefixes as possible are expanded from the next largest prefix length L2 and allocated to this bin. If the prefixes in L2 are exhausted, prefixes are expanded from the next prefix length; continue until the partially filled bin is full.

This is repeated for all prefix lengths.

Figure 5:
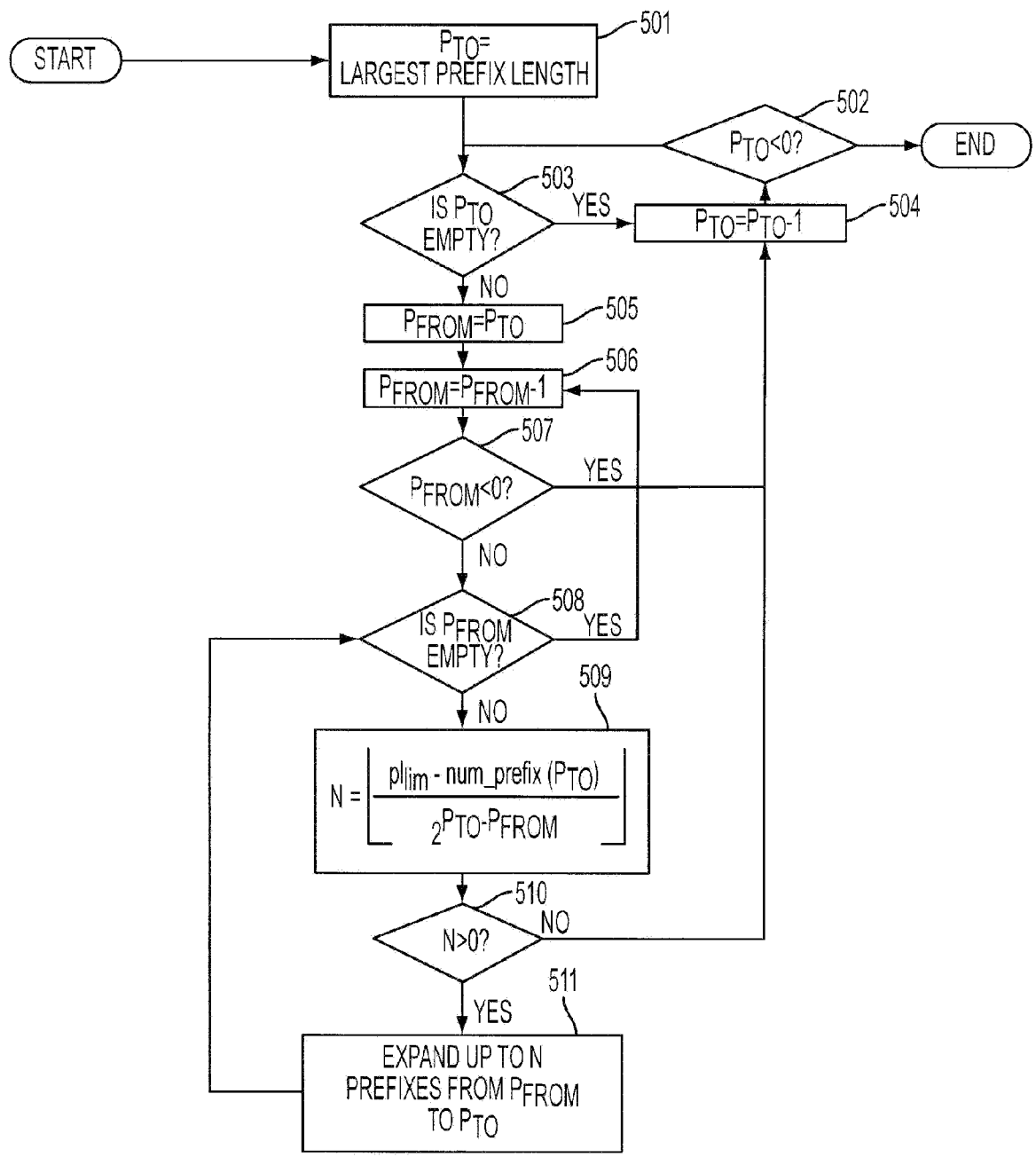
FIG. 5 shows an exemplary implementation of the disclosed prefix expansion technique.

FIG. 5 shows the prefix expansion algorithm. In Box 501, $P_{to}$ is assigned to the largest prefix length. In Box 502-504, $P_{to}$ is adjusted to the largest populated prefix length. $P_{to}$ is the destination prefix length into which prefixes will be expanded. Next, $P_{from}$, the source prefix length from which prefixes will be expanded, is found (Box 505-508, FIG. 5). In Box 509, the maximum number of prefixes that can be expanded from $P_{from}$ into $P_{to}$ given the capacity constraints of $P_{to}$ is computed. If this number is 0, the next $P_{from}$ is found (Box 510). Otherwise, the expansion proceeds until the destination prefix length cannot accommodate any more prefixes (Box 511).

Figure 6:
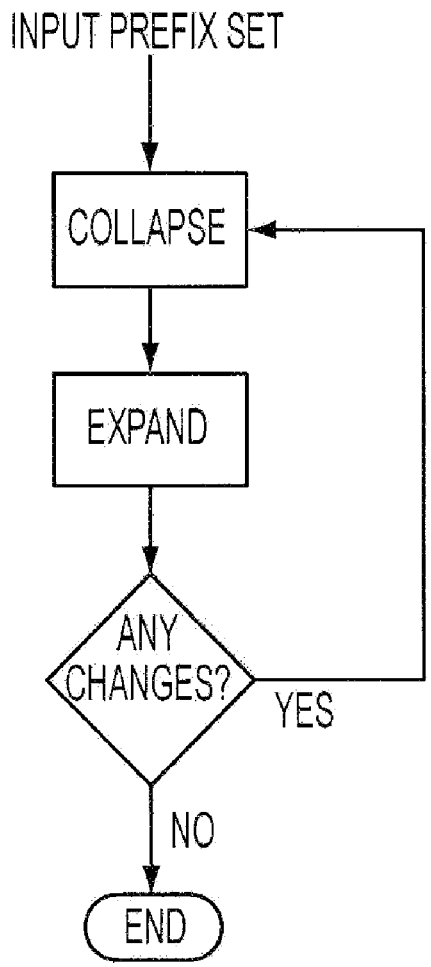
FIG. 6 shows an exemplary implementation of an overall technique.

These two algorithms together comprise the disclosed prefix pre-processing technique. The overall procedure is shown in FIG. 6. The collapse and expand procedure loop is repeated until no further changes are possible.

IV.D. Table Updates

In network routers, prefix tables are regularly updated. Updates include addition of new prefixes, deletion or changing the forwarding information of existing prefixes. Prefix pre-processing makes updates a little more complicated since a prefix may have been collapsed or expanded into a different prefix length.

Assume that the set of prefix lengths after prefix pre-processing is S={pl1, pl2 ... plL}. All prefixes that existed prior to prefix pre-processing are labeled as "original" prefixes.

After prefix pre-processing, a tag is appended to every prefix indicating its original prefix length. The tag may be appended in hardware for hardware implementations or within software data structures for software implementations.

The following schemes outline the different kinds of updates:

Addition of a prefix: A new prefix of length l is collapsed or expanded using the algorithms in FIG. 4 and FIG. 5. If a collision occurs with an existing prefix P', P' is overwritten only if its original length (determined by examining its prefix length tag) is less or equal to l.

Removal of a prefix: In order to remove an original prefix P of length l, all prefix lengths in S are examined since P may have been expanded or collapsed into a different prefix length. Prefixes that match P, and whose prefix length tags equal l, are removed.

Changing the forwarding information of a prefix: In order to change the forwarding information of a prefix P of length l, all prefix lengths in S are examined since P may have been expanded or collapsed into a different prefix length. The forwarding information of prefixes that match P, and whose prefix length tags equal l, is changed accordingly.

The above discussed techniques can be implemented in any suitable computing environment. A computer program product including computer readable media that includes instructions to enable a computer or a computer system to implement the disclosed teachings is also an aspect of the invention.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of storing addresses in a database comprising:
generating original prefixes representing the addresses to be stored in the database;
dynamically determining prefix lengths;
generating reduced prefixes by at least one of collapsing and collapsing followed by expanding the original prefixes such that a number of reduced prefixes is less than a number of original prefixes, wherein the expanding is performed using a sub-process comprising:
(a) selecting a largest prefix length;
(b) allocating prefixes of the largest prefix length into one or more bins with preselected capacities;
(c) selecting a bin from the number of bins that is partially filled;
(d) expanding a subset of prefixes of a next largest populated length and allocating them to the selected bin until the selected bin is full;
(e) repeating (a) through (d) for all prefix lengths; and storing the reduced prefixes in the database.

2. The method of claim 1, wherein the generating of sub-prefix comprises replacing two prefixes binary bits of 0 and 1 at a specific position with a single prefix with a variable bit at the specific position.

3. The method of claim 1, wherein the expanding comprises replacing a prefix having a variable bit in a specific position replaced by two prefixes having a 0 and a 1 bits at the specific position, respectively.

4. The method of claim 1, wherein the said addresses are IP addresses.

5. The method of claim 1, wherein at least one bin is a memory.

6. The method of claim 1, wherein collapsing is performed by a sub-process comprising:
(a) generating a set of prefixes P each of the same length $L_1$ having a common sub-prefix with a length $L_2$ that is less than said length $L_1$
(b) extracting a largest subset of prefixes having the same destination from the set of prefixes P;
(c) generating a prefix p of length equal to the sub-prefix length $L_2$ from the extracted subset if (i) any prefix of length $L_2$ already exists in the set of prefixes P and (ii) the generated prefix p of length equal to the sub-prefix length $L_2$ does not already exist in set of prefixes P.

* * * * *